(12) United States Patent
Dudar et al.

(10) Patent No.: US 11,493,000 B1
(45) Date of Patent: Nov. 8, 2022

(54) SYSTEM AND METHOD FOR CONTROLLING FLOW IN A FUEL RECIRCULATION LINE

(71) Applicant: FORD GLOBAL TECHNOLOGIES, LLC, Dearborn, MI (US)

(72) Inventors: Aed Dudar, Canton, MI (US); Dennis Seung-Man Yang, Canton, MI (US); Jeevagan Natarajan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/243,779

(22) Filed: Apr. 29, 2021

(51) Int. Cl.
*F02M 25/08* (2006.01)
*F02D 41/00* (2006.01)
*F02D 19/06* (2006.01)

(52) U.S. Cl.
CPC ..... *F02M 25/0836* (2013.01); *F02D 19/0681* (2013.01); *F02D 41/003* (2013.01); *F02M 25/089* (2013.01); *F02M 25/0854* (2013.01); *F02M 25/0872* (2013.01); *F02D 2200/0602* (2013.01)

(58) Field of Classification Search
CPC .......... F02M 25/0836; F02M 25/0854; F02M 25/089; F02D 19/0681; F02D 41/003; F02D 2200/0602
USPC ........................................................ 123/519
See application file for complete search history.

(56) References Cited

U.S. PATENT DOCUMENTS

| | | | | |
|---|---|---|---|---|
| 4,395,991 A | * | 8/1983 | Miyachi | F02M 25/0836 123/519 |
| 5,819,796 A | * | 10/1998 | Kunimitsu | B60K 15/03519 141/59 |
| 7,383,856 B2 | * | 6/2008 | Martiš | B60K 15/035 123/518 |
| 8,888,901 B2 | * | 11/2014 | Kimoto | B01D 53/0446 96/108 |
| 8,931,523 B2 | * | 1/2015 | Hagen | B60K 15/03519 141/94 |
| 9,267,467 B2 | | 2/2016 | Peters et al. | |
| 9,732,706 B2 | | 8/2017 | Dudar et al. | |
| 2015/0337777 A1 | * | 11/2015 | Hagen | F02M 33/04 123/519 |

* cited by examiner

*Primary Examiner* — Mahmoud Gimie
(74) *Attorney, Agent, or Firm* — Brooks Kushman P.C.; Vincent Mastrogiacomo

(57) ABSTRACT

A vehicle and a fuel system for a vehicle are provided. The fuel system has a fuel tank, a fuel fill inlet fluidly connected to the fuel tank to receive fuel dispensed from an external fuel supply device, and a recirculation line with a first end fluidly connected to the fuel fill inlet and a second end fluidly connected to the fuel tank. An ejector is positioned within the recirculation line. A valve fluidly connects the ejector to the fuel tank via a drain line. A method of fueling a vehicle is also provided.

19 Claims, 3 Drawing Sheets

SYSTEM AND METHOD FOR CONTROLLING FLOW IN A FUEL RECIRCULATION LINE

TECHNICAL FIELD

Various embodiments relate to a vehicle fuel system with a recirculation line.

BACKGROUND

A fuel system for a vehicle has a fuel tank with a fuel fill port. The fuel tank may be periodically filled or refueled via the fuel fill port. The fuel system may additionally be connected by a vapor line to an evaporative emissions system with a canister to adsorb fuel vapors. The fuel system may be provided with a recirculation line connecting the vapor line to the fuel fill port to recirculate fuel vapor during refueling to reduce air entrainment and reduce further vaporization of fuel within the tank.

SUMMARY

In an embodiment, a fuel system is provided with a fuel tank, a fuel fill inlet fluidly connected to the fuel tank to receive fuel dispensed from an external fuel supply device, and a recirculation line with a first end fluidly connected to the fuel fill inlet and a second end fluidly connected to the fuel tank. An ejector is positioned within the recirculation line. A valve fluidly connects the ejector to the fuel tank via a drain line.

In another embodiment, a method of fueling a vehicle is provided. Liquid fuel is dispensed into a fuel tank via a fuel fill inlet. Vapor is recirculated from the fuel tank to the fuel fill inlet via a recirculation line with an ejector in response to the liquid fuel being dispensed. A vacuum is drawn on a check valve via the ejector thereby maintaining the check valve in a closed position to prevent fluid flow between the recirculation line and the fuel tank and through the check valve.

In an embodiment, a vehicle is provided with a fuel tank, a fuel fill inlet fluidly connected to the fuel tank to receive fuel dispensed from an external fuel supply device, and a recirculation line with a first end fluidly connected to the fuel fill inlet and a second end fluidly connected to the fuel tank. An ejector is positioned within the recirculation line. A check valve fluidly connects the ejector to the fuel tank via a drain line. The ejector draws suction on the check valve to maintain the check valve in a closed position in response to vapor flow through the recirculation line and ejector during fueling of the fuel tank, and liquid fuel in the recirculation line drains into the fuel tank via the check valve and the drain line. The vehicle has an evaporative emissions system with a fuel vapor canister, with the evaporative emissions system fluidly connected to the recirculation line between the ejector and the second end.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
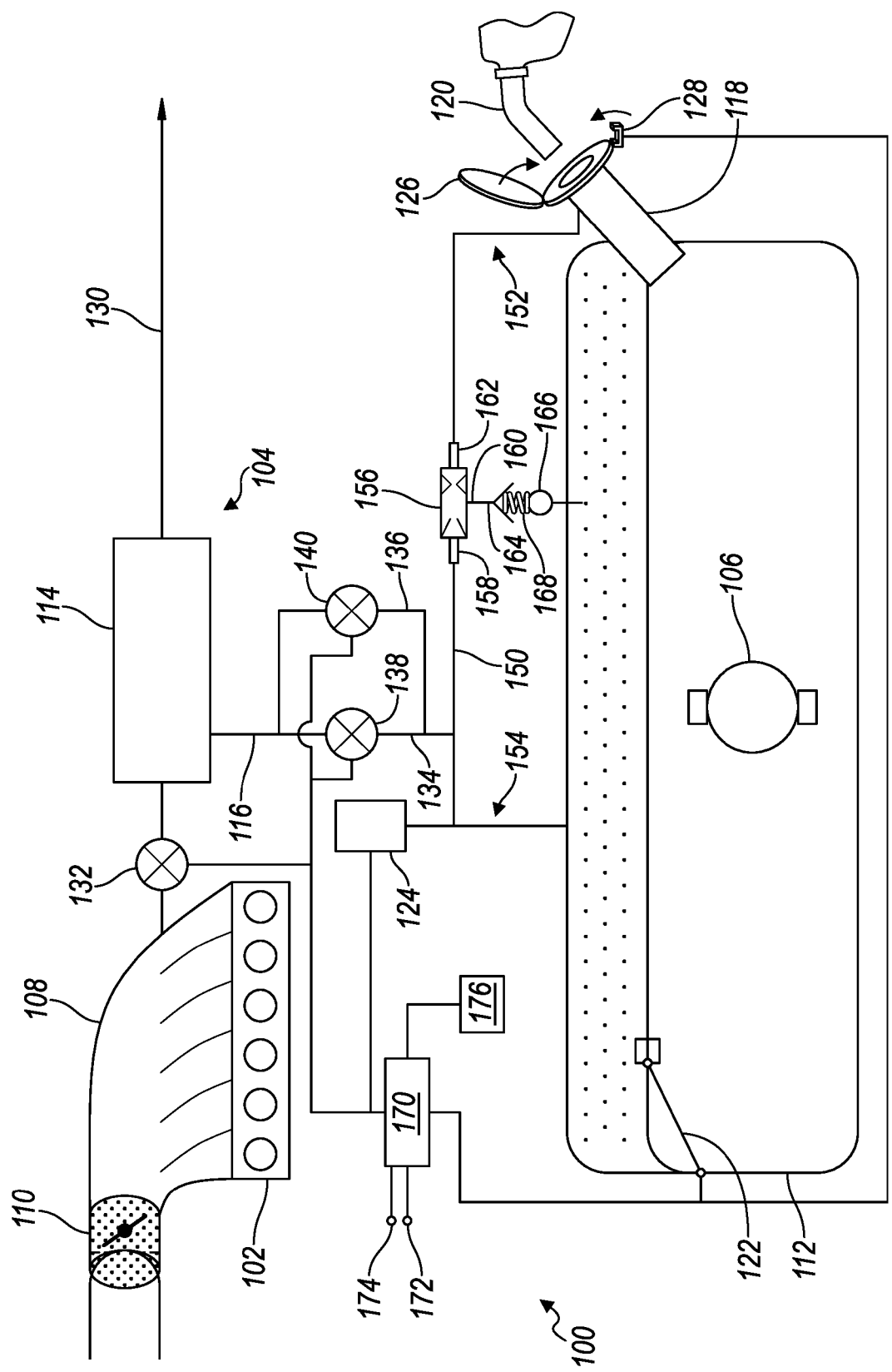
FIG. 1 illustrates a schematic view of a vehicle fuel system according to an embodiment.

FIG. 1 illustrates a fuel system 100 for a vehicle. The vehicle may be a conventional vehicle, or may be a hybrid vehicle powered by both an internal combustion engine as well as another propulsion source such as an electric motor. The fuel system 100 delivers fuel to an internal combustion engine 102, and is also provided with an evaporative emissions system 104. The fuel system 100 to the engine has a fuel pump 106 to pressurize fuel to deliver to the engine 102, and may include a fuel injector system according to one example.

The engine 102 has one or more cylinders, an engine intake manifold 108 and an engine exhaust manifold (not shown). The engine intake 108 has a throttle 110 fluidly coupled to the engine intake manifold.

The fuel system 100 has a fuel storage tank 112. The fuel tank 112 is sized to receive a volume of fuel. The fuel tank may be provided by a single tank, or multiple tanks fluidly connected to one another. In various non-limiting examples, the fuel may be a liquid fuel such as gasoline, diesel, alcohol fuels, a mixture thereof, or the like. As used herein, fluid refers to a substance in its liquid phase state, vapor or gas phase state, or a saturated liquid—vapor mixture.

Vapors generated in the fuel system 100 may be directed to an evaporative emissions system 104. The evaporative emission system 104 has a fuel vapor canister 114 fluidly connected to the fuel tank 112 via a vapor recovery line 116 or vent line 116. The fuel vapor canister 114 is fluidly connected to the engine intake manifold 108 to purge vapors in the canister 114 to the engine 102. The vapor recovery line 116 may include one or more conduits and one or more valves for isolating the fuel tank 112 during certain conditions, as described in further detail below.

The fuel tank 112 in the fuel system 100 may be periodically filled, fueled, refilled or refueled from an external fuel source via a fuel fill inlet 118. The fuel fill inlet 118 has a neck or filler pipe and may be sized to receive a nozzle or other fuel dispensing device of the external fuel source 120. According to various examples, the external fuel source 120 may be a fuel pump at a gas station, a portable gas can or gas tank, or a mobile refueling system such as a refueling vehicle or truck. The fuel system 100 may be provided with a fuel level sensor 122 to indicate the fuel level in the fuel tank 112 to the vehicle operator, e.g. via a fuel gauge or other indicator in a vehicle instrument panel. The fuel tank 112 may additionally be provided with a fuel tank pressure transducer 124 to sense the pressure within the fuel tank, and the transducer 124 may be positioned in the vent line 116.

The fuel fill inlet 118 may be closed via a fuel fill cap 126 or other closure member. The fuel fill cap 126 may include a sealing member to seal the cap to the fuel tank 112, and prevent fluids, including vapor from exiting the fuel tank 112 via the fuel fill inlet 118 when the cap 126 is closed. Alternatively, the fuel fill cap 126 may be provided by a valve, e.g. in a capless fuel tank. The fuel fill cap 126 or a refueling door may additionally include a refueling lock or refueling locking mechanism 128 with a latch or other element to prevent the fuel fill cap 126 from being opened or removed, or to prevent an external fuel source nozzle 120 from opening the valve in a capless system. A controller as described below may control the locking mechanism 128 to open or unlock the refueling lock, for example, to limit access to the fuel tank 112, or to prevent an operator from opening the fuel fill cap 126 when a fuel tank 112 pressure is above a threshold pressure value. The refueling lock mechanism 128 may be actively controlled, e.g. via a solenoid, and is unlocked when the fuel tank 112 pressure is below a threshold pressure value. Alternatively, locking and unlocking of the refueling lock mechanism 128 may be passively controlled via a pressure diaphragm or the like.

The fuel vapor canister 114 of the evaporative emissions system 104 may be filled with an adsorbent material, such as activated carbon, to temporarily trap or retain fuel vapors from the fuel tank 112, e.g. during fueling the fuel tank or during vehicle operation. The fuel vapor canister 114 may include an atmospheric ventilation line 130 between the canister and atmosphere for venting vapors from the canister 114 to atmosphere and/or for drawing fresh outside air into the canister 114.

A canister purge valve (CPV) 132 is positioned between the fuel vapor canister 114 and the intake manifold 108 to control the flow of fuel vapor from the canister 114 into the engine 102. The CPV 132 may be opened during a canister 114 purge process, for diagnostics of the evaporative emissions system 104 and/or fuel system 100, and the like.

Vehicles may be required to have diagnostics to validate the integrity of the fuel system 100, including the evaporative emissions system 104, for potential leaks, and to purge the canister 114 of the evaporative emissions system 104. Generally, the evaporative emissions system 104 is purged when the engine 102 is operating such that the operating engine combusts the fuel vapors.

The ventilation line 116 may include a first conduit 134 and a second conduit 136 arranged for parallel flow between the fuel tank 112 and the canister 114. A tank pressure control (TPC) valve 138 may be positioned within the first conduit 134. A refueling (RF) valve 140 may be positioned within the second conduit 136. Each of the TPC and RF valves 138, 140 may be separately controlled. Furthermore, each of the TPC and RF valves 138, 140 may be normally closed valves. The TPC and RF valves 138, 140 control venting of the fuel tank 112 to the canister 114. The TPC valve 138 may be provided with a smaller orifice or aperture than the RF valve 140.

The fuel tank 112 may be a sealed fuel tank, as is shown in FIG. 1, such that the fuel tank 112 may be at a higher or lower pressure than outside, atmospheric pressure. For example, a sealed fuel tank 112 may reach pressures as high as 30-40 kPa above atmospheric pressure, or 5-10 kPa below atmospheric pressure. The fuel tank 112 pressure may vary from atmospheric pressure based on diurnal temperature cycles. For a sealed fuel tank 112, the tank walls may be formed from a metal or other structural material to withstand pressure changes within the fuel tank. The fuel tank 112 therefore contains any vaporized fuel during vehicle operation or from diurnal temperature changes, and the canister 114 adsorbs fuel vapors from depressurization of the fuel tank 112 and during refueling.

The fuel system 100 also has a recirculation line 150 with a first end 152 and a second end 154. The first end 152 is fluidly connected to the fuel fill inlet 118. The second end 154 is fluidly connected to the fuel tank 112 at a location away from or spaced apart from the fuel fill inlet 118, and furthermore may be fluidly connected to or form a portion of the ventilation line 116. The recirculation line 150 may additionally include one or more vent valves to the fuel tank 112 such as grade vent valve, or the like (not shown).

During fueling of the fuel tank 112, the recirculation line 150 allows for vapor displaced by the increasing liquid fuel in the fuel tank 112 to flow from the second end 154 of the recirculation line 150 to the first end 152 of the recirculation line and back to the fuel fill inlet 118. The vapor recirculation through the recirculation line 150 may reduce air entrainment by fuel flowing into the fuel tank 112 and hence reduce fuel vaporization inside the tank 112. This may allow for a reduction in size of the vapor canister 114 and associated adsorbent material.

The recirculation line 150 may additionally provide a passage directly between the fuel filling inlet 118 and the evaporative emissions system 104, and bypass the fuel tank 112. For a bottom feeding tank, a vapor path between the fuel filling inlet 118 and the evaporative emissions system 104 and canister 114 may become blocked at higher fuel levels within the fuel tank 112, and the recirculation line 150 provides a vapor passage to the fuel filling inlet 118 for diagnostic purposes.

The recirculation line 150 has an ejector 156 positioned within an intermediate location of the recirculation line 150 between the first and second ends 152, 154. The ejector 156 may be positioned within a local low spot or trap in the recirculation line 150, and in one example, is positioned at the lowest point in the recirculation line 150 that is close to the fuel tank 112. The first and second conduits 134, 136 or ventilation line 116 for the evaporative emissions system 104 may be connected to the recirculation line 150 between the second end 154 of the recirculation line and the ejector 156.

The ejector 156 may be provided as a passive vacuum ejector. The ejector 156 has a motive fluid inlet 158 to a primary nozzle, a secondary flow inlet 160, a converging-diverging nozzle, and an outlet 162. During refueling, vapor flow through the recirculation line 150 flows into the motive fluid inlet 158, through the converging-diverging nozzle, and through the outlet 162. This flow of vapor through the ejector 156 creates a vacuum on the secondary flow inlet 160 via the Venturi effect to draw in and entrain fluid from the secondary flow inlet 160 into the ejector 156 and converging diverging nozzle.

The converging diverging nozzle within the ejector 156 may replace a fixed orifice that is otherwise provided within the recirculation line 150 to limit vapor flow through the recirculation line 150 and prevent vapor from exiting the fuel filling inlet 118 during refueling such that the recirculation line 150 according to the present disclosure does not have a separate fixed orifice apart from the ejector 156.

The recirculation line 150 includes a drain conduit 164 or drain line. The drain line 164 is connected to the secondary flow inlet 160 of the ejector. A valve 166 is positioned within the drain conduit 164 between the secondary flow inlet 160 to the ejector and the fuel tank 112. The valve 166 is movable between a closed position and an open position, with the closed position preventing flow through the drain line 164. Therefore, the ejector 156 is positioned to draw suction on the valve 166 to maintain the valve 166 in a closed position in response to vapor flow through the recirculation line 150 and the ejector 156 during fueling of the fuel tank 112. By closing the valve 166 during refueling, the recirculation line 150 is not fluidly short circuited by vapor flow through the drain line 164, which would cause a bypass to first end 152 of the recirculation line and the fuel filling inlet 118 and may increase vapor generation during refueling.

The valve 166 may be provided as a passive valve, such as a passive check valve. The valve 166 may be a normally closed valve, a normally open valve, or an indeterminate valve.

The valve 166 may further be provided with a biasing member 168, such as a spring. The biasing member 168 may bias the valve 166 towards a closed position by exerting a force on the valve member. When the valve 166 is biased towards the closed position, the suction on the valve 166 as provided by the ejector 156 acts to further increase the force on the valve 166 to maintain the valve in the closed position. The force provided by the biasing member 168 is selected such that it is overcome by the weight of a small volume of liquid fuel on the valve 166, e.g. one cubic centimeter of liquid fuel, to open the valve 166, move the valve 166 to the open position when liquid is present in the ejector 156, or allow the liquid to seep past the valve 166.

Alternatively, the biasing member 168 may bias the valve 166 towards an open position. When the valve 166 is biased towards an open position, the force provided by the biasing member 168 is selected such that it is overcome by suction force in the secondary inlet 160 of the ejector 156 to close the valve 166, or move the valve 166 to the closed position. The valve 166 may further be a normally open valve without a biasing member, with gravity acting on the valve 166 to move it towards an open position, with the ejector 156 drawing vacuum on the valve 166 to close it.

During refueling, vapor is displaced in the fuel tank 112 by the added liquid fuel from the external source 120. This displaced vapor flows into the ventilation line 116 and second end 154 of the recirculation line 150, through the ejector 156, and back through the first end 152 of the recirculation line into the fuel filling inlet 118. The fuel vapor therefore acts as a motive fluid through the ejector 156 and enters via the motive fluid inlet 158, and exits via the outlet 162. The flow of vapor through the ejector 156 draws a vacuum on the secondary inlet 160 and the valve 166, to maintain the valve 166 in a closed position and prevent gas flow through the drain line 164. As the fuel vapor flows into the fuel filling inlet 118 from the recirculation line 150, it may be further entrained by the liquid fuel stream into the fuel tank 112, further enhancing vapor flow through the recirculation line 150.

When fueling the fuel tank 112, the fuel level within the fuel tank 112 may reach the first end 152 or the second end 154 of the recirculation line 150, and furthermore, liquid fuel may be able to enter the recirculation line 150, ventilation line 116, TPC valve 138, RF valve 140, or evaporative emissions system 104. This may occur when refueling the tank 112 on uneven or sloped terrain, or may occur when trickle filling the fuel tank 112. Trickle filling the fuel tank 112 is when an operator continues to add fuel to the tank 112 after an automatic cutoff switch causes the dispensing device 120 to stop pumping fuel. When there is liquid fuel within the recirculation line 150 or elsewhere in the evaporative emissions system 104, the liquid may pool or otherwise reach the valve 166 in the drain line 164.

The valve 166 allows for draining any fuel in the TPC or RF valves 138, 140, the evaporative emissions system 104, or recirculation line 150 back into the fuel tank 112. For example, when fueling the vehicle, fuel vapor flows through the recirculation line 150 until the liquid fuel level reaches the first end 152 or second end 154 of the recirculation line 150, and potentially enters the TPC valve 138, RF valve 140, or recirculation line 150, which blocks or stops the flow of vapor through the recirculation line 150. With no flow through the recirculation line 150, there is no flow through the ejector 156, and the ejector 156 stops drawing a vacuum on the secondary inlet 160 and valve 166. At this point, any liquid in the evaporative emissions system 104 (including the TPC valve, RF valve, ventilation line or recirculation line) may drain through the valve 166 and return to the fuel tank 112. For a normally closed valve 166, the biasing member 168 may be selected such that only a small volume of liquid is sufficient to overcome the biasing force and open the valve 166 to drain the liquid. For a normally open or indeterminate valve 166, the liquid may pass through the valve 166 once the ejector stops drawing a vacuum on the valve 166.

Various components of the fuel system 100, evaporative emissions system 104, and engine 102 are in communication with a controller 170 or control system. The controller 170 may be provided as one or more controllers or control modules for the various vehicle components and systems. The controller 170 and control system for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The controller 170 may be in communication with other vehicle sensors, such as the fuel tank pressure transducer 124, the fuel lever sensor 122, an ambient pressure sensor 172, and an ambient temperature/humidity sensor 174. The controller 170 may additionally be configured to receive an input from the vehicle operator via one or more buttons, touch screens, voice commands, etc., via user interface 176. In one example, the controller 170 receives an input for refueling from an operator via a refueling button on the interface 176. In response to the refueling button being actuated, the controller 170 may depressurize the fuel tank 112, and unlock a locking mechanism 128 for a refueling cap 126 or door as described further below.

Figure 2:
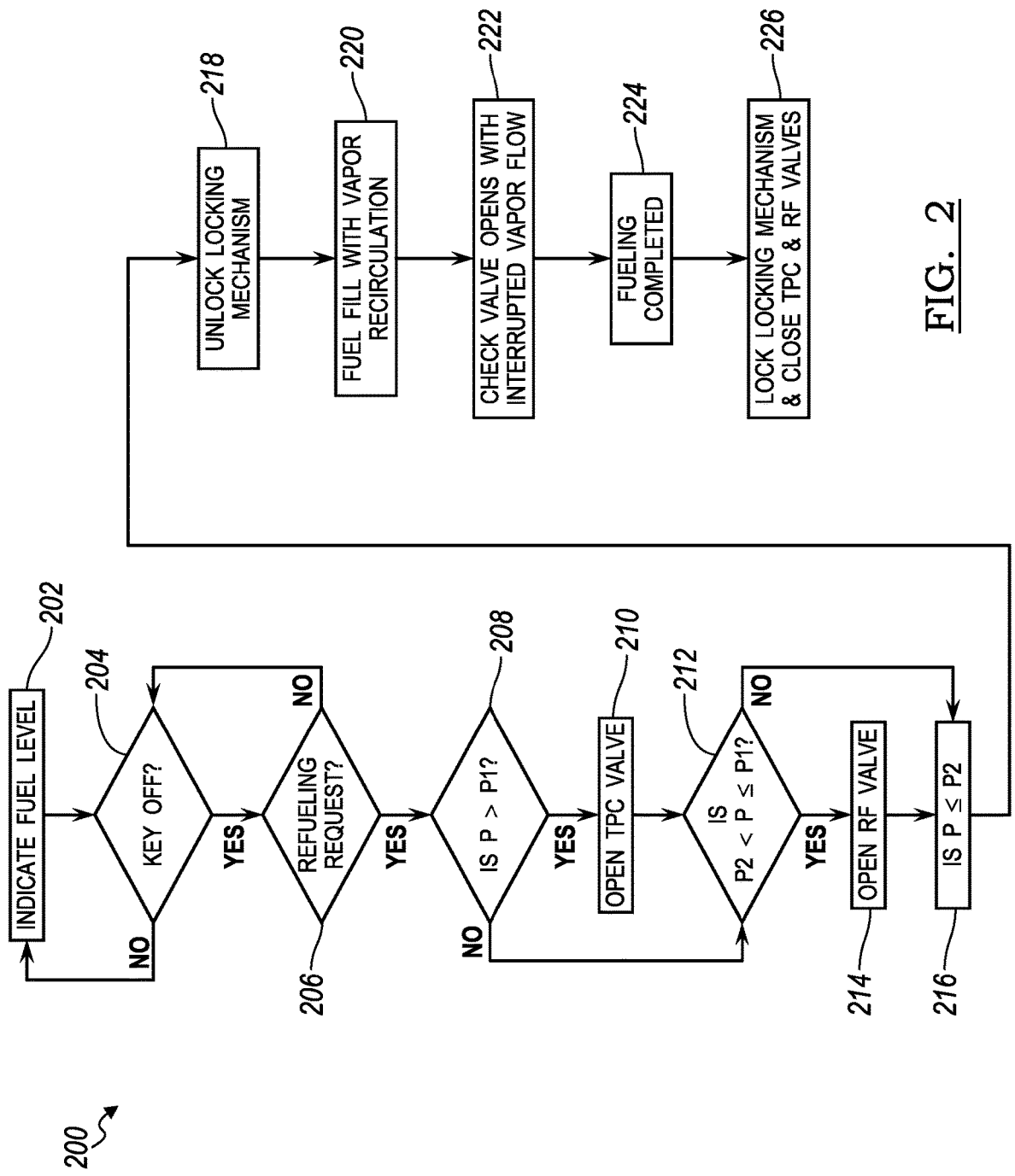
FIG. 2 illustrates a flow chart of a fueling process for the vehicle fuel system of FIG. 1.

FIG. 2 illustrates a method 200 of fueling a vehicle, and may be used with a fuel system 100 as shown in FIG. 1.

At step 202, the controller 170 receives a signal indicative of a fuel level in the fuel tank from a fuel level indicator 122, and provides an indication of a refueling request to the operator.

When the operator is ready to refuel, the vehicle is keyed off. Once it has been determined that the vehicle has been keyed off, or in inoperative at step 204, the operator may input a request to unlock the refueling locking mechanism 128, or a refueling request at step 206, for example, using a switch or other input in the vehicle on an interface 176.

The controller 170 monitors the pressure in the fuel tank 112 via the fuel tank pressure transducer 124. When the controller 170 receives the request to unlock the refueling locking mechanism 128 at step 206, the controller 170 compares the pressure (P) in the fuel tank 112 to first and second pressure threshold values P1, P2, with the first pressure threshold P1 greater than the second pressure threshold P2. Furthermore, both pressure thresholds P1, P2 may be greater than atmospheric pressure P0. Alternatively, the second pressure threshold P2 may be set as atmospheric pressure P0, or may be set as a predetermined value greater than atmospheric pressure P0.

If the fuel tank pressure P is greater than the first pressure threshold P1 at step 208, the controller 170 may open the TPC valve 138 while maintaining the RF valve 140 in the closed position at step 210 in order to begin depressurizing the fuel tank 112 by venting pressurized vapor in the fuel tank 112 to the canister 114. As the TPC valve 138 has a smaller orifice than the RF valve 140, the fuel tank 112 is vented more slowly or in a more controlled manner at higher pressures above the first threshold P1 with the TPC valve 138 open in comparison to opening the RF valve 140.

When the fuel tank pressure P reaches the first pressure threshold P1 at step 212, the controller 170 may then open the RF valve 140 at step 214, such that RF valve 140 or both the TPC and RF valves 138, 140 are open in order to continue to vent pressurized vapor in the fuel tank 112 to the canister 114 and reduce the pressure in the fuel tank 112.

When the fuel tank pressure P reaches or is below the second threshold P2 at step 216, the fuel tank 112 is depressurized or close to an atmospheric pressure P0, and the controller 170 may unlock the refueling locking mechanism 128 at step 218 and provide an indicator to the operator that the fuel fill door or cap 126 are unlocked and ready to open to begin refueling the fuel tank 112.

The fuel tank is then fueled with fuel from an external fuel source at step 220. As fuel flows into the fuel tank 112, vapor flows through the recirculation line 150, from the second end 154 through the ejector 156 and towards the first end 152. The flow through the ejector 156 draws a vacuum on the check valve 166 to maintain the valve 166 in the closed position, such that the drain line 164 is closed and the vapor flowing through the recirculation line 150 can only exit the recirculation line 150 at the first end 152 adjacent to the fuel filling inlet 118. As described above, this reduces vapor generation within the fuel tank 112 during refueling.

At step 222, if the vehicle is on uneven ground or sloped terrain during refueling, or when the fuel is filled to near or above a limit set for the fuel tank 112 by a fuel level vent valve, fuel may enter the ventilation line 116, the recirculation line 150, one or both of the TPC and RF valves 138, 140, or the evaporative emissions system 104 from either the fuel tank 112 and/or the fuel filling inlet 118. Liquid within the TPC valve 138 or RF valve 140 may prevent the TPC valve 138 or RF valve 140 from closing completely, or may impact valve reliability, and so liquid within the ventilation line 116, the recirculation line 150, one or both of the TPC and RF valves 138, 140, or elsewhere in the evaporative emissions system 104 is drained via the valve 166 in the drain line 164.

When there is liquid fuel at or above the first and/or second ends 152, 154 of the recirculation line 150, vapor flow through the recirculation line 150 is interrupted or stops, and liquid may be present within the ventilation line 116, the recirculation line150 , one or both of the TPC and RF valves 138, 140, and/or the evaporative emissions system 104. With the vapor flow through the recirculation line 150 stopped while the vehicle is being fueled, the ejector 156 stops drawing a vacuum on the valve 166 such that he valve may open, and liquid fuel within the ventilation line 116, the recirculation line 150 , one or both of the TPC and RF valves 138, 140, and/or the evaporative emissions system 104 may drain through the valve 166 and drain line 164 and back into the fuel tank 112. Depending on the valve 166 configuration, stopping vapor flow through the ejector 156 and/or the presence of liquid fuel on the ejector 156 side of the valve 166 may open the valve 166 to allow the liquid to enter the drain line 164 and drain to the fuel tank 112.

When fueling is completed at step 224, the fuel fill cap 126 is replaced, or a door to the fuel fill inlet 118 is closed, a switch signal from the fuel fill cap or fuel door is sent to the controller 170. The controller 170 may then lock the locking mechanism 128 and close the TPC and RF valves 138, 140 to end the fueling process.

Figure 3:
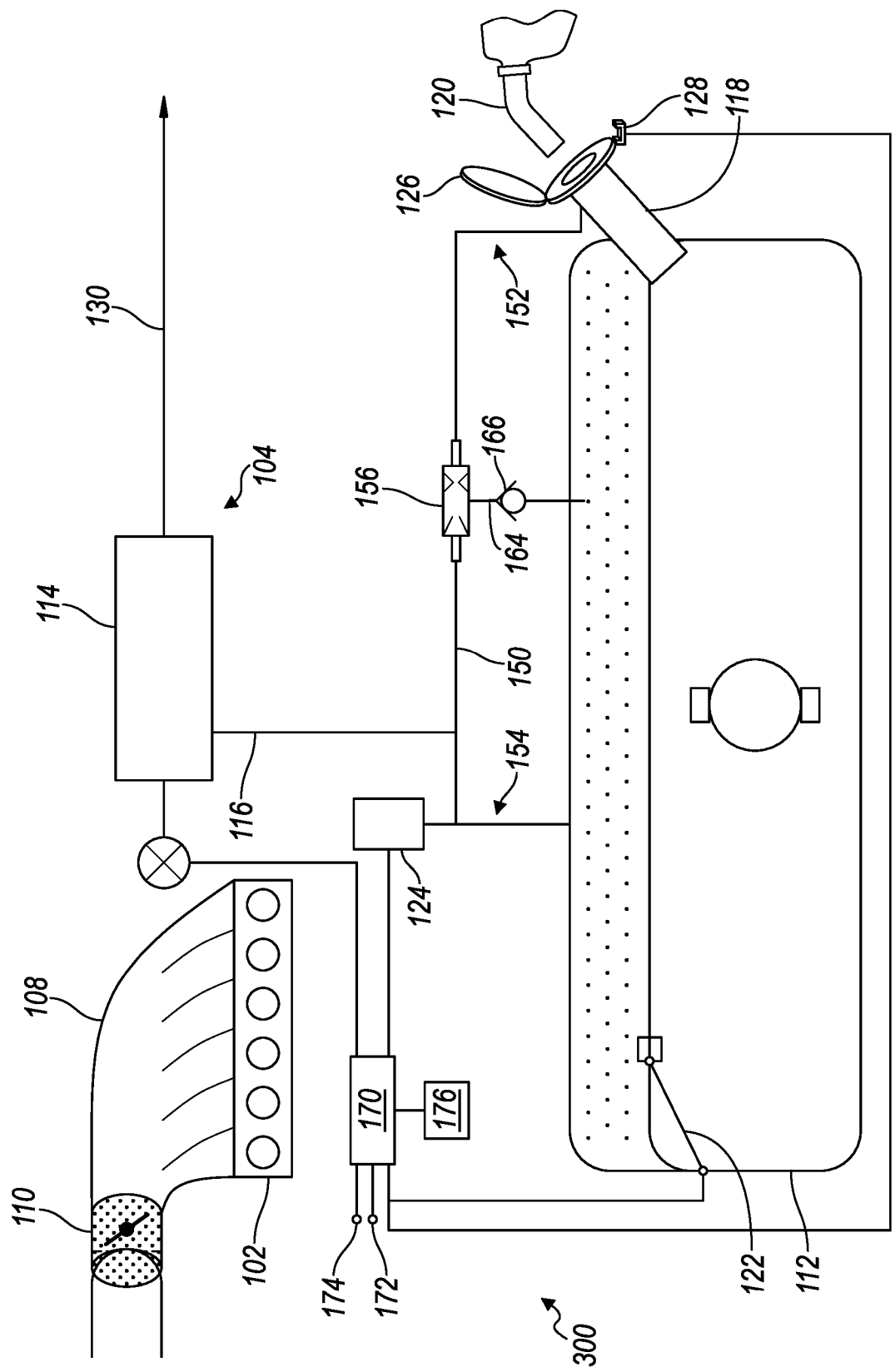
FIG. 3 illustrates another schematic view of a vehicle fuel system according to another embodiment.

FIG. 3 illustrates a fueling system 300 according to another example. Elements that are the same as or similar to those described above with respect to FIG. 1 are given the same reference number.

In FIG. 3, the fuel tank 112 is not a sealed or pressurized fuel tank, such that the pressure within the fuel tank 112 stays generally close to or within 0.1-1.0 kPa above or below atmospheric pressure. As such the ventilation line 116 between the fuel tank 112 and the canister 114 may be provided without any valve as shown, such that it is an open passage between the canister 114 and the fuel tank 112 or recirculation line 150. In alternative examples, a single valve, such as a fuel tank isolation valve may be positioned within the ventilation line 116 to control fluid flow between the fuel tank 112 and the canister 114.

The recirculation line 150 has an ejector 156 and valve 166 in a drain line 164 as described above with respect to FIG. 1, with the valve 166 draining any liquid fuel in the recirculation line 150, ventilation line 116, or evaporative emissions system 104 to the fuel tank 112.

Various embodiments according to the present disclosure have associated, non-limiting advantages. The ejector in the recirculation line is used to maintain a check valve in a drain line in a closed position, which maintains the continuity of the recirculation line between the first and second ends. The check valve may open when vapor flow through the recirculation line is interrupted to provide a drain path for any liquid fuel in the evaporative emissions system and recirculation line, and to prevent liquid fuel from entering the evaporative emissions system during refueling. The ejector and associated check valve provide a passive system to control vapor flow through the recirculation line, and drainage of any liquid fuel in the recirculation line and evaporative emissions system While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A fuel system comprising:
   a fuel tank;
   a fuel fill inlet fluidly connected to the fuel tank to receive fuel dispensed from an external fuel supply device;
   a recirculation line with a first end fluidly connected to the fuel fill inlet and a second end fluidly connected to the fuel tank;
   an ejector positioned within the recirculation line, the ejector having a motive fluid inlet to a primary nozzle, a secondary flow inlet, and an outlet, wherein the motive fluid inlet is positioned to receive flow from the second end of the recirculation line, and wherein the outlet is positioned to provide flow to the first end of the recirculation line; and a valve fluidly connecting the secondary flow inlet of the ejector to the fuel tank via a drain line;

wherein the ejector is positioned to draw suction on the valve via the secondary flow inlet to maintain the valve in a closed position in response to vapor flow through the recirculation line and the ejector during fueling of the fuel tank.

2. The fuel system of claim 1 wherein liquid fuel in the recirculation line flows through the secondary flow inlet of the ejector, the valve, and the drain line and into the fuel tank.

3. The fuel system of claim 1 wherein the valve is a check valve.

4. The fuel system of claim 1 wherein the valve comprises a biasing member to bias the valve towards an open position.

5. The fuel system of claim 1 wherein the valve comprises a biasing member to bias the valve towards the closed position.

6. The fuel system of claim 5 wherein the valve opens in response to liquid fuel in the recirculation line exerting a force on the biasing member.

7. The fuel system of claim 1 further comprising an evaporative emissions system fluidly connected to the recirculation line between the motive fluid inlet of the ejector and the second end, the evaporative emissions system including a fuel vapor canister positioned to receive fuel vapor from the fuel tank via the second end of the recirculation line.

8. The fuel system of claim 7 wherein the evaporative emissions system further comprises a first valve fluidly coupling the recirculation line to the canister via a first conduit, and a second valve fluidly coupling the recirculation line to the canister via a second conduit, the second conduit in parallel to the first conduit.

9. The fuel system of claim 8 further comprising a controller configured to (i) in response to receiving a refueling request when a pressure in the fuel tank is above a threshold, open the first valve and the second valve, and (ii) unlock a refueling lock when the pressure in the fuel tank is below the threshold.

10. The fuel system of claim 9 wherein the controller is further configured to lock the refueling lock, close the first valve, and close the second valve in response to a door to the fuel fill inlet being closed.

11. A method of fueling a vehicle, comprising:
dispensing liquid fuel into a fuel tank via a fuel fill inlet;
recirculating vapor from the fuel tank to the fuel fill inlet via a recirculation line with an ejector in response to the liquid fuel being dispensed, wherein recirculating vapor flows into a primary motive inlet of the ejector to an outlet of the ejector; and
drawing a vacuum on a check valve via a secondary flow inlet of the ejector thereby maintaining the check valve in a closed position to prevent fluid flow between the recirculation line and the fuel tank and through the check valve.

12. The method of claim 11 further comprising draining liquid fuel from the recirculation line into the fuel tank via the secondary flow inlet of the ejector and the check valve in an open position.

13. The method of claim 12 wherein vapor recirculation through the recirculation line is interrupted in response to a fuel level in the fuel tank exceeding a threshold level such that liquid fuel in the recirculation line drains into the fuel tank via the check valve.

14. The method of claim 12 further comprising biasing the check valve towards the closed position.

15. The method of claim 11 further comprising:
in response to receiving a refueling request when a pressure in the fuel tank is above a threshold, opening at least one valve fluidly connecting the recirculation line to a fuel vapor canister of an evaporative emissions system; and
unlocking a refueling lock when the pressure in the fuel tank is below the threshold.

16. The method of claim 15 further comprising locking the refueling lock, and closing the at least one valve in response to a door to the fuel fill inlet being closed.

17. A vehicle comprising:
a fuel tank;
a fuel fill inlet fluidly connected to the fuel tank to receive fuel dispensed from an external fuel supply device;
a recirculation line with a first end fluidly connected to the fuel fill inlet and a second end fluidly connected to the fuel tank;
an ejector positioned within the recirculation line;
a check valve fluidly connecting the ejector to the fuel tank via a drain line, wherein the ejector draws suction on the check valve to maintain the check valve in a closed position in response to vapor flow through the recirculation line and ejector during fueling of the fuel tank, and wherein liquid fuel in the recirculation line drains into the fuel tank via the check valve and the drain line; and
an evaporative emissions system with a fuel vapor canister, the evaporative emissions system fluidly connected to the recirculation line between the ejector and the second end.

18. The vehicle of claim 17 wherein the evaporative emissions system further comprises a first valve fluidly coupling the recirculation line to the canister via a first conduit, and a second valve fluidly coupling the recirculation line to the canister via a second conduit, the second conduit in parallel to the first conduit.

19. The vehicle of claim 18 further comprising a fuel door to the fuel fill inlet, the fuel door with a refueling lock; and
a controller in communication with the first valve, the second valve, and the refueling lock, the controller configured to (i) in response to receiving a refueling request when a pressure in the fuel tank is above a threshold, open the first valve and the second valve, (ii) unlock the refueling lock when the pressure in the fuel tank is below the threshold, and (iii) lock the refueling lock, close the first valve, and close the second valve in response to the fuel door being closed.

* * * * *